(12) United States Patent
Wicaksana et al.

(10) Patent No.: US 10,484,215 B2
(45) Date of Patent: Nov. 19, 2019

(54) ASYNCHRONOUS TRANSMISSION FOR NFC CARD EMULATION MODE

(71) Applicant: Huawei International Pte. Ltd., Singapore (SG)

(72) Inventors: Harya Wicaksana, Singapore (SG); Zhan Yu, Singapore (SG); Rui Yu, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 0 days.

(21) Appl. No.: 15/965,386

(22) Filed: Apr. 27, 2018

(65) Prior Publication Data

US 2018/0248722 A1    Aug. 30, 2018

Related U.S. Application Data

(63) Continuation of application No. PCT/SG2016/050573, filed on Nov. 22, 2016.

(30) Foreign Application Priority Data

Dec. 4, 2015   (SG) .......................... 10201509972Y

(51) Int. Cl.
| | |
|---|---|
| *H04L 27/00* | (2006.01) |
| *G06K 19/07* | (2006.01) |
| *H04B 5/00* | (2006.01) |
| *H04L 27/26* | (2006.01) |
| *H04W 4/80* | (2018.01) |
| *H04L 27/34* | (2006.01) |

(52) U.S. Cl.
CPC ...... *H04L 27/0014* (2013.01); *G06K 19/0723* (2013.01); *H04B 5/0031* (2013.01); *H04L 27/2657* (2013.01); *H04L 27/34* (2013.01); *H04L 2027/003* (2013.01); *H04W 4/80* (2018.02)

(58) Field of Classification Search
CPC ............ H04L 27/0014; H04L 27/2657; H04L 2027/003; H04L 27/00; H04B 5/0031; H04W 4/80; G06K 19/0723
See application file for complete search history.

(56) References Cited

U.S. PATENT DOCUMENTS 7,929,910 B2 *   4/2011   Chen ........................ H04B 5/02
                                                                          455/343.1
8,934,836 B2    1/2015   Lefley
(Continued)

FOREIGN PATENT DOCUMENTS

EP        2779018 A2    9/2014

*Primary Examiner* — Jean B Corrielus

(74) *Attorney, Agent, or Firm* — Leydig, Voit & Mayer, Ltd.

(57) ABSTRACT

A system and method for an NFC card for use in asynchronous NFC card emulation mode transmission. The method comprises estimating carrier frequency offset between a carrier frequency of a NFC reader and a carrier frequency of the NFC card, adjusting digital baseband sampling of the baseband sample output at the NFC card emulation mode transmitter based on the estimated carrier frequency offset to obtain an adjusted baseband sample output and modulating a RF transmitter in the NFC card emulation mode transmitter based on the adjusted baseband sample output.

20 Claims, 10 Drawing Sheets

(56) References Cited

U.S. PATENT DOCUMENTS

| | | | |
|---|---|---|---|
| 2004/0067741 A1* | 4/2004 | Fei | H04L 27/2657 |
| | | | 455/192.1 |
| 2004/0132418 A1* | 7/2004 | Wildhagen | H03D 1/2254 |
| | | | 455/130 |
| 2007/0021122 A1* | 1/2007 | Lane | H04B 7/01 |
| | | | 455/441 |
| 2007/0194932 A1* | 8/2007 | Oishi | H04B 1/525 |
| | | | 340/572.7 |
| 2012/0027131 A1* | 2/2012 | Sethi | H04L 27/2647 |
| | | | 375/329 |
| 2015/0063517 A1 | 3/2015 | Verlinden et al. | |
| 2015/0139283 A1* | 5/2015 | Dalton | H04L 7/0087 |
| | | | 375/219 |
| 2015/0180650 A1* | 6/2015 | Li | H04B 1/0014 |
| | | | 375/355 |
| 2015/0222415 A1* | 8/2015 | Chae | H03L 7/06 |
| | | | 375/376 |
| 2015/0249510 A1 | 9/2015 | Dhayni et al. | |
| 2015/0256324 A1 | 9/2015 | Kang et al. | |
| 2016/0006557 A1* | 1/2016 | Shirakawa | H04L 27/22 |
| | | | 375/362 |

\* cited by examiner

ASYNCHRONOUS TRANSMISSION FOR NFC CARD EMULATION MODE

CROSS-REFERENCE TO RELATED APPLICATIONS

This application is a continuation of International Application No. PCT/SG2016/050573, filed on Nov. 22, 2016, which claims priority to Singaporean Patent Application No. 10201509972Y, filed on Dec. 4, 2015. The disclosures of the aforementioned applications are hereby incorporated by reference in their entireties.

FIELD OF THE INVENTION

This invention relates to a method and system for asynchronous communication in a Near Field Communication (NFC) system. Particularly, this invention relates to a method and system for generating a clock frequency that is close to the clock frequency received from the NFC reader for use in asynchronous communication in an NFC system.

BACKGROUND

Near Field Communication (NFC) enables contactless short range communication between two devices, typically requiring distance of 4 cm or less to initiate a connection. The connection can be done much faster than other communication technologies like Bluetooth or WiFi. The user only needs to bring two NFC supported devices closer and data will be transferred automatically. Some of its applications include credit card payment, ticketing, content sharing, quick pairing, and etc.

In general, an NFC device requires very low power or no power for transmission when it operates in tag or card emulation mode. An NFC tag/card device will first detect a radio frequency (RF) magnetic field from NFC reader device. The magnetic field energy is used to power the load component in the NFC tag/card device and transfer the data using passive load modulation (PLM). The term "passive" is used here because there is no need for the NFC tag/card device to use its own energy for the transmission. Thus, when implemented in any mobile phone or tablet, it still works when the battery dies and it does not affect device battery consumption.

While having good advantages, passive load modulation has its drawbacks. The amount of magnetic field that can be absorbed by the NFC tag/card device is limited to the antenna coupling between two NFC devices. Antenna coupling performance can deteriorate, for example, when a smaller antenna is used or when two NFC devices are further apart.

Another NFC tag/card emulation technique is Active Load Modulation (ALM). This technique is getting popular as there is a strong interest in integrating NFC technology into mobile phones or tablets. Mobile phones or tablets have their own battery power, and thus, the NFC tag/card devices will be able to utilize their own battery power to generate the magnetic field during load modulation. ALM mode is also more suitable for smaller antenna implementation in the device and has better performance than the PLM mode. However, for both PLM and ALM modes, normally clock recovery is required to ensure synchronous transmission between NFC devices.

A known NFC using analog phase-locked loop (PLL) to control ALM is disclosed in U.S. Pat. No. 8,934,836 B2. FIG. 1 shows the circuitry design of the NFC between two devices disclosed in U.S. Pat. No. 8,934,836 B2.

The NFC Device 2 includes a clock recovery process 200 in the Analog module to recover the clock $f_{R1}$ from NFC Device 1 magnetic field. The PLL is configured to receive one of the recovered clock and reference clock, and to utilize the received clock to control the active load modulation at both the digital receiver module and digital transmitter module. A driver is also used to adjust the amplitude of the voltage across the antenna. Since the clock recovery process is able to recover the clock $f_{R1}$ from NFC Device 1 magnetic field, the transmission signal clock from NFC Device 2 can be exactly the same as $f_{R1}$. As a result, the NFC Device 1 will receive active load modulated signal from NFC Device 2 as conventional tag passive load modulated signal.

Unfortunately, U.S. Pat. No. 8,934,836 B2 requires a complex analog RF front end with the clock recovery process 200 to recover the clock $f_{R1}$, and subsequently to use $f_{R1}$ to control both the ALM reception and transmission. Further, the clock recovery process 200 and magnetic field generation may require the analog PLL forced in open loop state, which is difficult to implement in practice. Simpler or less complex of RF analog RF front end is desired for combo-chipset implementation where the size of analog RF front end could be limited.

In light of the above, those skilled in the art are striving to improve the clock recovery process for current NFC.

SUMMARY OF THE INVENTION

The above and other problems are solved and an advance in the art is made by systems and methods provided by embodiments in accordance with the invention. A first advantage of embodiments of systems and methods in accordance with the invention is that there is no complex analog clock recovery in an analog module since asynchronous transmission at different clocks is adopted. A second advantage of embodiments of systems and methods in accordance with the invention is that NFC reader/poll devices do not need to perform any clock offset adjustment to receive NFC tag/card device signals generated at different clock frequencies.

The above advantages are provided by embodiments of a system and a method in accordance with the invention operating in the following manner.

In accordance with embodiments of this invention, a method for an NFC card for use in asynchronous NFC card emulation mode transmission is provided. The method comprises estimating a carrier frequency offset between a carrier frequency of a NFC reader and a carrier frequency of the NFC card, adjusting digital baseband sampling of the baseband sample output at the NFC card emulation mode transmitter based on the estimated carrier frequency offset to obtain an adjusted baseband sample output, and modulating an RF transmission based on the adjusted baseband sample output.

In accordance with embodiments of this invention, the step of estimating carrier frequency offset is triggered upon detecting a radio frequency (RF) magnetic field from the NFC reader.

In accordance with embodiments of this invention, the step of estimating carrier frequency offset is provided in the following manner. The method obtains an in-phase component (I) and a quadrature phase component (Q) for a number of samples of an input signal from an analog-to-digital converter (ADC) of the NFC card. The phase for each sample is then computed with the following expression:

$\tan^{-1}(Q/I)$. Subsequently, the phase differences between a number of adjacent samples from the input signal are computed. These phase differences are then averaged to obtain the estimated carrier frequency offset which is in turn stored on a memory.

In accordance with embodiments of this invention, the step of obtaining the set of inphase component (I) and quadrature phase component (Q) for the signal from the ADC is provided in the following manner. The input signal at intermediate frequency is down-converted into a complex signal centered at zero frequency. Subsequently, a low pass filter is applied to filter harmonics components from the complex signal. The input signal at intermediate frequency into a complex signal centered at zero frequency is down-converted by multiplying the input signal with $\cos(2\pi*fc/fs*n)$ to obtain inphase component (I) and multiplying the input signal with $\sin(2\pi*fc/fs*n)$ to obtain quadrature phase component (Q), wherein fc is the carrier frequency, fs is the ADC sampling frequency, and n is the sample number.

In accordance with embodiments of this invention, the step of adjusting digital baseband sampling of the baseband sample output at the NFC card emulation mode transmitter based on the estimated carrier frequency offset may be provided in the following manner. Input sample stream is received from a subcarrier generator. In response to receiving the input same stream, variables n, k and Acc are reset to zero. The estimated carrier frequency offset (CFO) is retrieved from the memory and the absolute of the estimated CFO is added to Acc. If the Acc is less than the input sampling frequency of the NFC card, the method outputs the input sample stream with the following expression output[k]=input[n], where output[k] is the output sample with reference to k, input[n] is the input sample with reference to n. If there are any more input sample streams, the method increments n and k by 1 and repeats from the step of adding the absolute of the estimated CFO to Acc. If the Acc is more than the input sampling frequency of the NFC card, the method determines if the estimated CFO is greater than zero. If the estimated CFO is greater than zero, the method adds one sample and deducts the Acc by input sampling frequency. The method adds one sample by incrementing n by 1 and outputting the input sample with the following expression output[k]=input[n]. If the estimated CFO is less than zero, the method skips one sample and deducts the Acc by input sampling frequency. The method skips one sample by incrementing n by 1 and outputting the input sample with the following expression output[k]=input[n].

In accordance with embodiments of this invention, the step of adjusting digital baseband sampling of the baseband sample output at the NFC card emulation mode transmitter based on the estimated carrier frequency offset may be provided in the following manner. Input sample stream is received from an encoder. In response to receiving the input sample stream from an encoder, the method sets Acc to zero and retrieves the estimated CFO from the memory. The absolute of the estimated CFO is added to Acc. If the Acc is less than the data-rate, the method establishes the number of samples for each encoded bit, N, is equal to number of samples per information bit, Bit_Len, where data-rate is equal to sampling frequency divided by Bit_Len. If the Acc is more than the data-rate, the method deducts the Acc by data-rate and determines if the estimated CFO is greater than zero. If the estimated CFO is greater than zero, the method establishes that N is equal to Bit_Len+1. If the estimated CFO is less than zero, the method establishes that N is equal to Bit_Len−1. The digital baseband sample for 1 bit duration is then generated based on value of N. If there are any more input sample streams, the method repeats from the step of adding the absolute of the estimated CFO to Acc.

In accordance with embodiments of this invention, an NFC card having a carrier frequency offset (CFO) estimation module, a sample adjustment module and an analog transmission module is provided to perform the method as described above.

BRIEF DESCRIPTION OF THE DRAWINGS

The above advantages and features in accordance with this invention are described in the following detailed description and are shown in the following drawings.

DETAILED DESCRIPTION

This invention relates to a method and system for asynchronous communication in a Near Field Communication (NFC) system. Particularly, this invention relates to a method and system for generating a clock frequency that is close to the clock frequency received from the NFC reader for use in asynchronous communication in a NFC system.

A clock offset adjustment is introduced in a NFC tag/card device for NFC transmission. This is different from conventional communication systems, such as cellular communications, WiFi or Bluetooth communications, where no clock offset adjustment is carried out at the transmission and the clock offset is typically taken care of at the receiver.

In conventional NFC PLM communication, the NFC tag/card device recovers the clock from the NFC reader/poll device magnetic field and uses this recovered clock to transmit the response frames back to the NFC reader/poll device. So by nature of equal clock frequency, the NFC reader/poll device does not carry out any clock adjustment at the response frame reception.

With local power supply, an NFC tag/card device may adopt ALM communication. However, the NFC reader/poll device has no idea whether the NFC tag/card device is in PLM or ALM mode. Further, the NFC reader/poll device may not carry out any clock adjustment at the response frame reception. Hence, NFC tag/card device transmission at ALM mode should guarantee the clock of transmitted signal to be synchronized (both frequency and phase) with the NFC reader/poll device clock.

In U.S. Pat. No. 8,934,836 B2, the NFC tag/card device transmission employs the clock recovery process in an Analog module to guarantee the clock of transmitted signal matches with NFC reader/poll device clock. In this invention, we introduce a sample-based low complexity method to compensate carrier frequency offset between an NFC tag/card device an and NFC reader/poll device, without the analog clock recovery process.

The processes for asynchronous communication of NFC tag/card emulation mode will be described below.

Figure 1:
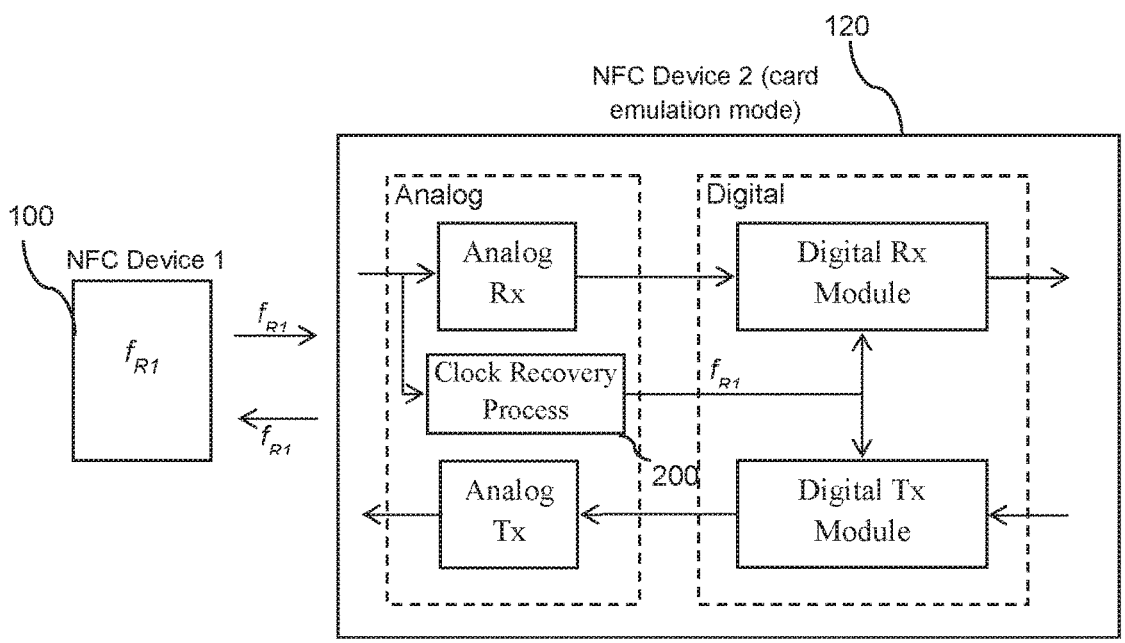
FIG. 1 illustrates a known circuitry design of NFC between two devices.
Figure 2:
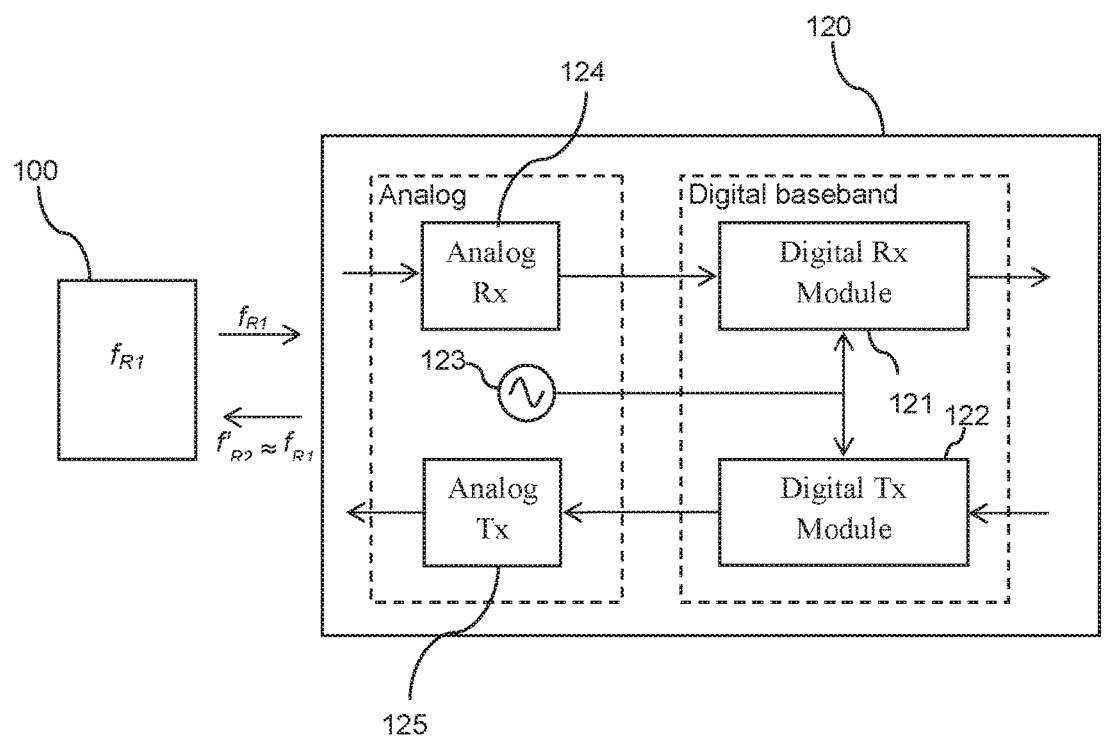
FIG. 2 illustrates an overview of an asynchronous transmission between two NFC devices in accordance with an embodiment of this invention.

FIG. 2 illustrates the overview of an asynchronous transmission between two NFC devices. NFC Device 1 100 is a typical reader or poll device in NFC protocol with a clock frequency of $f_{R1}$. This means that the magnetic field generated by NFC device 1 100 is $f_{R1}$. NFC Device 2 120 is an NFC tag/card or listen device in ALM mode. The NFC Device 2 102 employs a local clock generator 123 to generate the clock frequency of $f_{R2}$ and supplies this clock to both digital receiver module 121 and digital transmission module 122, where $f_{R2}$ may not be the same as $f_{R1}$. The local clock generator 123 is used as a reference clock in all NFC card digital modules including the Digital RX module 121 and the Digital TX module 122.

Since $f_{R2}$ is unlikely to be the same as $f_{R1}$, the digital receiver module 121 of NFC Device 2 120 adjusts the clock offset between $f_{R1}$ and $f_{R2}$ at the demodulation and decoding. Further details in this regard will be described below with reference to FIG. 5.

The digital transmission module 122 of NFC Device 2 120 employs a sample-based low complexity method to compensate carrier frequency offset between $f_{R1}$ and $f_{R2}$. Further details pertaining to the sample-based low complexity method will be described below with reference to FIG. 5. As a result, the transmitted signal from NFC Device 2 120 is at the clock frequency of $f_{R2}$, which is approximated to $f_{R1}$ but might not be exactly the same as $f_{R1}$. Thus, this is an asynchronous transmission to NFC Device 1 100.

For purposes of this discussion, an NFC tag/card device means the NFC device is in card emulation mode. The term 'tag' and 'card' can be used interchangeably.

Figure 3:
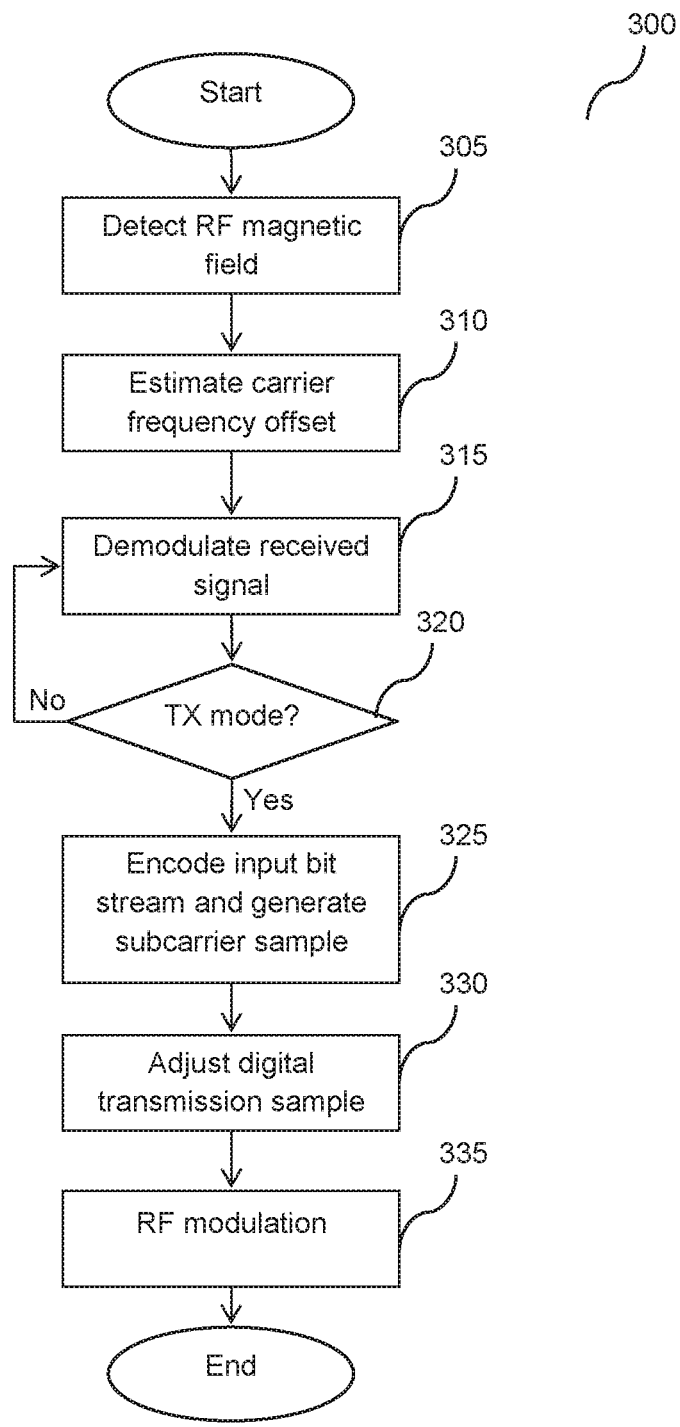
FIG. 3 illustrates an overview of a process flow performed by an NFC device in card emulation mode upon detecting a carrier signal from another NFC device in accordance with an embodiment of this invention.

FIG. 3 illustrates an overview of a process flow 300 performed by NFC Device 2 120 upon detecting a carrier signal, $f_{R1}$, from NFC Device 1 100. The process flow 300 begins with 305 where NFC Device 2 120 detects an RF magnetic field from NFC Device 1 100. The signal received is processed in the analog receiving module 124 in a conventional manner. Particularly, the signal is converted to a digital signal by an ADC. For brevity, specific details pertaining to the analog receiving module 124 are omitted.

In step 310, NFC Device 2 120 estimates the clock frequency offset, $\Delta f = f_{R1} - f_{R2}$, and stores the clock frequency offset information to a memory in the digital baseband. NFC Device 2 then continues to demodulate the received signal from NFC Device 1 in step 315. In step 320, process 300 determines whether NFC Device 2 120 is being switched to a transmission state. If NFC Device 2 120 is still in a receiving state, process 300 repeats step 315. In brief, the step 315 repeats until the NFC Device 2 is ready for transmission to NFC Device 1. If the NFC Device 2 120 is being switched to a transmission state, process 300 proceeds to step 325. Further details regarding demodulating of the received signal will be described below with reference to FIGS. 7 and 8.

In step 325, NFC Device 2 performs encoding and subcarrier generation of the information bit stream. In step 330, NFC Device 2 adjusts the digital baseband output samples based on the clock frequency offset estimation information stored on the memory. Further details regarding the adjustment of digital transmission sample will be described below with reference to FIGS. 9-12. After the adjustment, the frequency of an RF transmitted signal will be very close to $f_{R1}$ and process 300 proceeds to step 335 to perform RF modulation by the analog transmission module 125 in a conventional manner. For brevity, specific details pertaining to the analog receiving module 124 are omitted. Process 300 ends after step 335.

Advantageously, NFC Device 1, which could be from a different manufacturer, does not need to perform any additional processing to receive the signal from NFC Device 2 since the $f_{R2}$ is almost equal to $f_{R1}$.

In brief, the process for asynchronous NFC card emulation transmission comprises:
1. Estimating the carrier frequency offset (CFO) at the NFC card emulation mode receiver after RF field detection;
2. Storing the CFO information to the memory;
3. Adjusting a digital sample of the baseband sample output at the NFC card emulation mode transmitter based on the CFO information;
4. Modulating the RF transmission based on the adjusted baseband sample output.

An embodiment of this invention may include demodulation of the NFC reader signal after the carrier frequency offset estimation.

Figure 4:
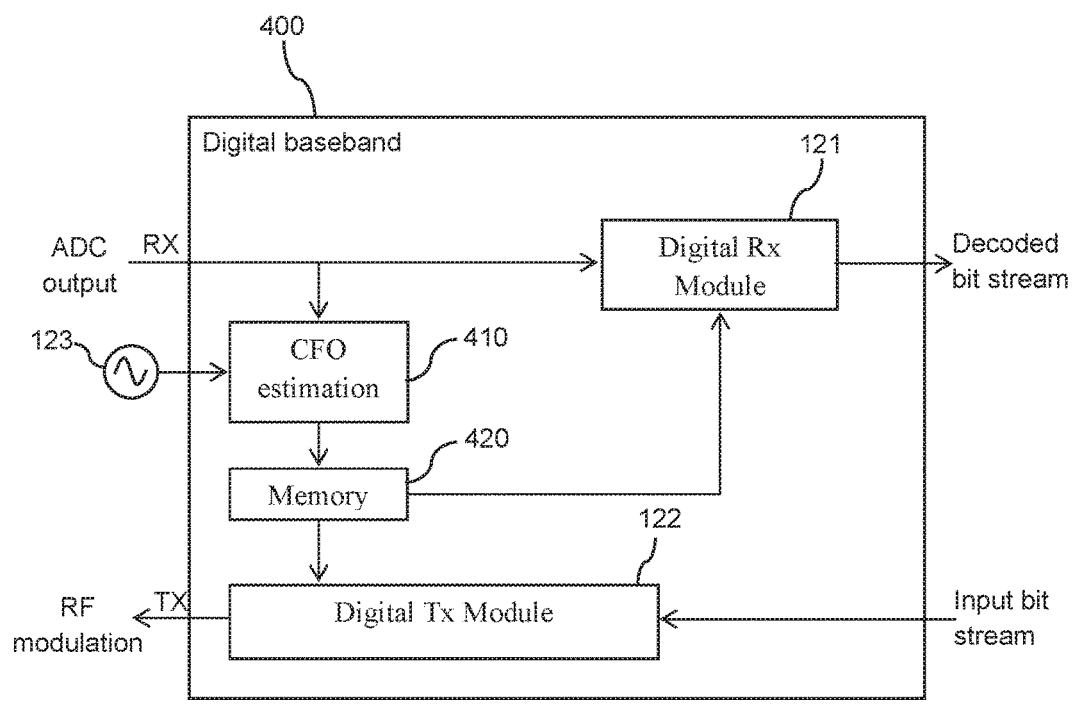
FIG. 4 illustrates a block diagram of the digital baseband of an NFC device in asynchronous transmission in accordance with an embodiment of this invention.

FIG. 4 illustrates the overall block diagram of the digital baseband 400 of NFC Device 2 120 in asynchronous transmission. The digital baseband 400 of an NFC card emulation receiver comprises CFO estimation module 410, memory 420, digital receiving module 121 and the digital transmission module 122. The digital receiving module 121 converts the received signal into a decoded bit stream using the carrier frequency offset from the memory 420. The digital transmission module 122 converts the input bit stream into a baseband sampling output for RF modulation.

Figure 5:
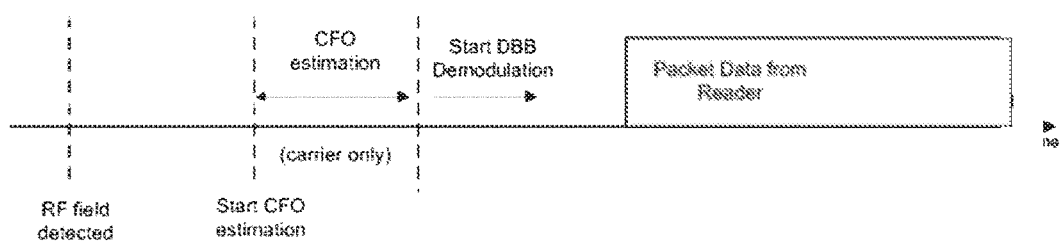
FIG. 5 illustrates a receiver processing timeline at the NFC device in asynchronous card emulation mode in accordance with an embodiment of this invention.

FIG. 5 illustrates the receiver processing timeline at NFC Device 2 in asynchronous card emulation mode. Automatic gain control (AGC) adjustment may be included before CFO estimation to ensure a stable receiving signal at the receiver. CFO estimation is performed during a carrier wave (CW) period, which is available before receiving an NFC Device 1 packet.

Further details regarding the CFO estimation module 410 will be described below with reference to FIG. 6. Further details regarding digital receiving module 121 and digital transmission module 122 will be described below with reference to FIGS. 7-8 and 9-12 respectively.

Figure 6:
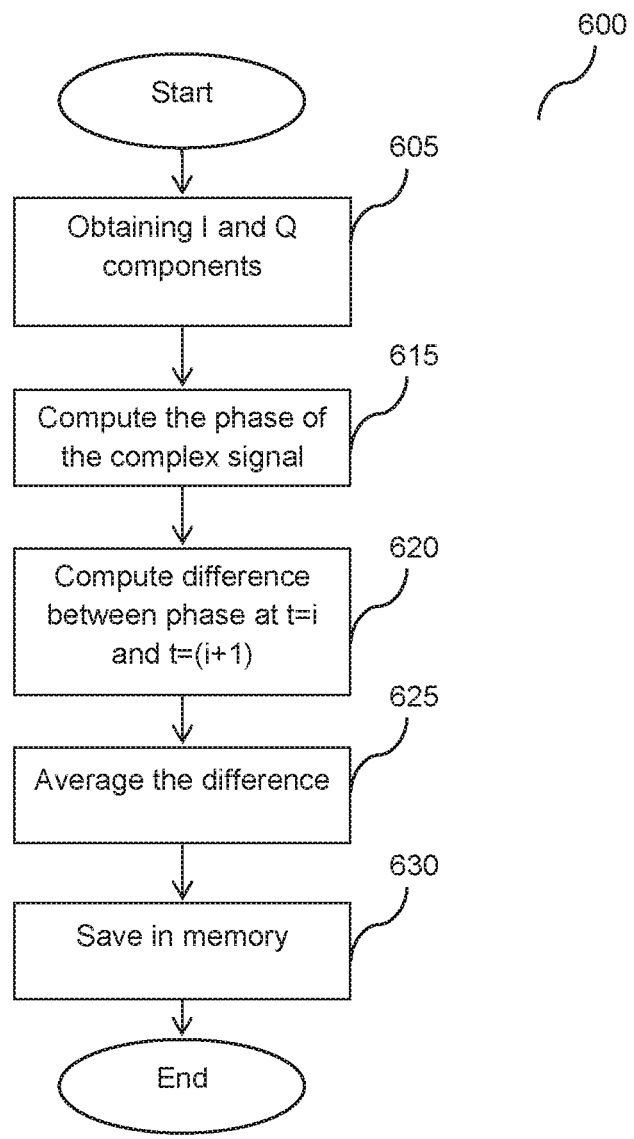
FIG. 6 illustrates a process flow performed by a CFO estimation module in accordance with an embodiment of this invention.

FIG. 6 illustrates a process flow 600 being performed by the CFO estimation module 410. The process 600 begins with step 605 by obtaining an in-phase component (I) and a quadrature phase component (Q) for a number of samples from the ADC output. The set of in-phase component (I) and quadrature phase component (Q) can be obtained in the following manner. First, the input signal (i.e. the ADC output) is down-converted at intermediate frequency into a complex signal centered at zero frequency. Particularly, the down-converting is by multiplying the input signal by a locally generated down conversion sample of $\cos(2\pi*fc/fs*n)$ and $\sin(2\pi*fc/fs*n)$ to obtain the in-phase component (I) and quadrature component (Q) respectively, where fc is the carrier frequency, fs is the ADC sampling frequency, and n is the sample number. In this exemplary embodiment of invention, fs is equal to 4 times of fc. For fs=4fc, the down conversion becomes very simple as the $\cos(2\pi*fc/fs*n)$ and $\sin(2\pi*fc/fs*n)$ can be replaced by the sequence of (1,0,−1,0) and (0,1,0,−1), respectively. Particularly, when fs=4fc, $\cos(2\pi*fc/fs*n)$ would be equal to $\cos(\pi*n/2)$. Substituting the sample number n=0, 1, 2, 3, 4, 5 . . . into $\cos(\pi*n/2)$, we get $\cos(0)$, $\cos(\pi/2)$, $\cos(\pi)$, $\cos(3\pi/2)$, $\cos(2\pi)$, $\cos(2.5\pi)$ which would result in 1,0,−1,0,1,0,−1,0,1,0,−1,0 . . . . This is a repeated sequence of (1,0,−1,0).

Similarly for the sin function, when fs=4fc, $\sin(2\pi*fc/fs*n)=\sin(\pi*n/2)$. Substituting the sample number n=0, 1, 2, 3, 4, 5 . . . , we get $\sin(0)$, $\sin(\pi/2)$, $\sin(\pi)$, $\sin(3\pi/2)$, $\sin(2\pi)$, $\sin(2.5\pi)$ which would result in 0,1,0,−1,0,1,0,−1, 0,1,0,−1, . . . . This is a repeated sequence of (0,1,0,−1).

After down-converting the input signal, a low pass filtering is applied to filter away harmonics components from the input signal. Alternatively, a Coordinate Rotation Digital Computer (CORDIC) algorithm may be used to obtain the in-phase component (I) and quadrature phase component (Q) without departing from the invention.

In step 615, the phase of the vector from the complex signal output which consists of in-phase component (I) and quadrature phase component (Q) is computed using the following expression, phase=$\tan^{-1}(Q/I)$ for each sample. Essentially, the arctan of Q/I provides the phase shift of the vector of Q/I.

In step 620, the process 600 computes the phase differences between two adjacent samples, i.e. at t=i and t=(i+1) where i=1, 2, 3, . . . . In step 625, the CFO estimate is then obtained from the average of the phase differences between two adjacent samples. The estimated CFO is then stored on the memory in step 630. Process 600 ends after step 630.

Figure 7:
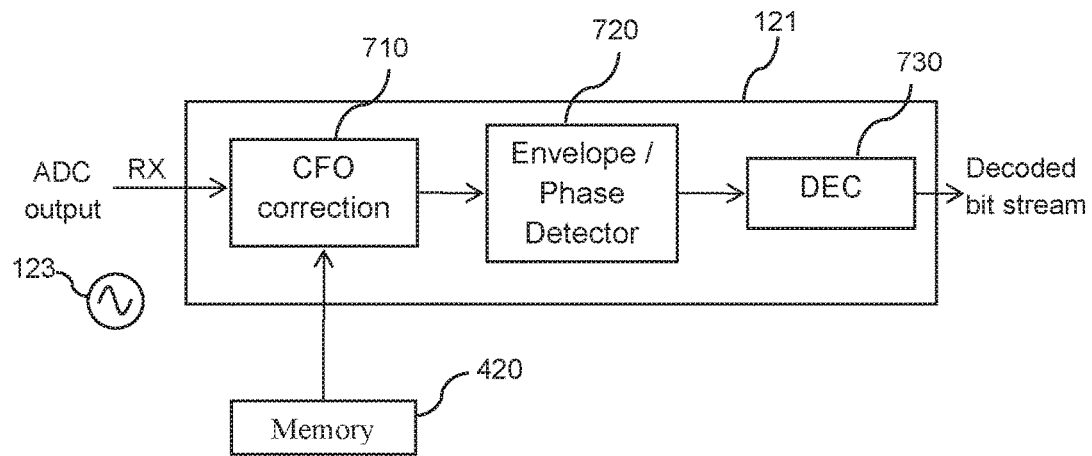
FIG. 7 illustrates a block diagram of a digital receiving module in accordance with an embodiment of this invention.

FIG. 7 illustrates a block diagram of digital receiving module 121. The digital receiving module 121 comprises a CFO correction module 710 to compensate the asynchronous frequency component, an envelope/phase detector 720 to detect the envelope/phase component of complex baseband signal, and a decoder (DEC) module 730 to obtain the decoded bit stream. The envelope/phase detector 720 or SYNC process may include DC cancellation to remove the DC component of the signal. Further, the envelope detector can be implemented by using simple approximation of the square root function. When a high precision envelope/phase detector is used, CFO correction module 710 may be replaced by a simple down conversion based on zero frequency offset.

Figure 8:
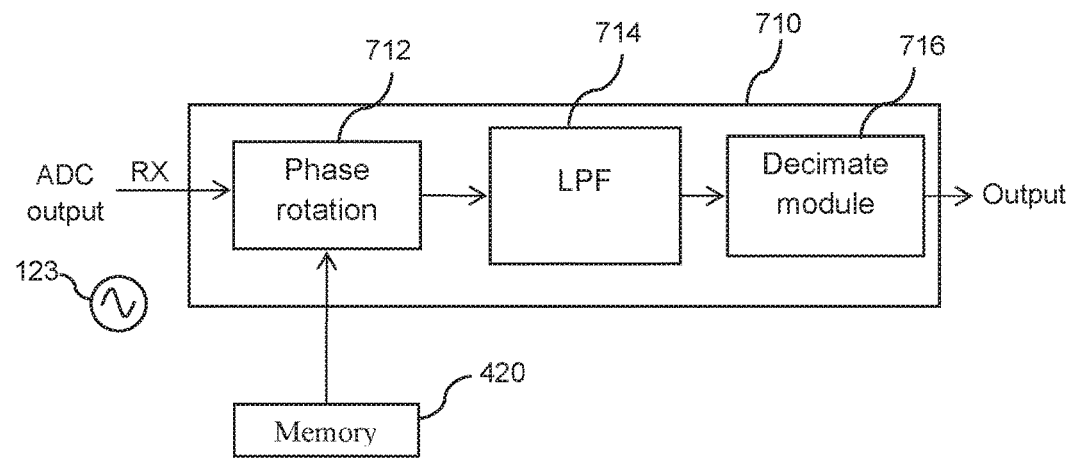
FIG. 8 illustrates an embodiment of a CFO correction module in accordance with an embodiment of this invention.

FIG. 8 illustrates an exemplary embodiment of the CFO correction module 710. The CFO correction module 710 may consist of phase rotation module 712, a low pass filter (LPF) 714 and a decimate module 716. The phase rotation is based on frequency offset information. The rotation is equivalent to multiplying the input with a locally generated down conversion sample of $\cos(2\pi*(fc+\Delta f)/fs*n)$ and $\sin(2\pi*(fc+\Delta f)/fs*n)$ where $\Delta f$ is carrier frequency offset. The LPF 714 filters the phase rotation output. The decimate module 716 decimates the CFO filter output to lower sampling rate.

Figure 9:
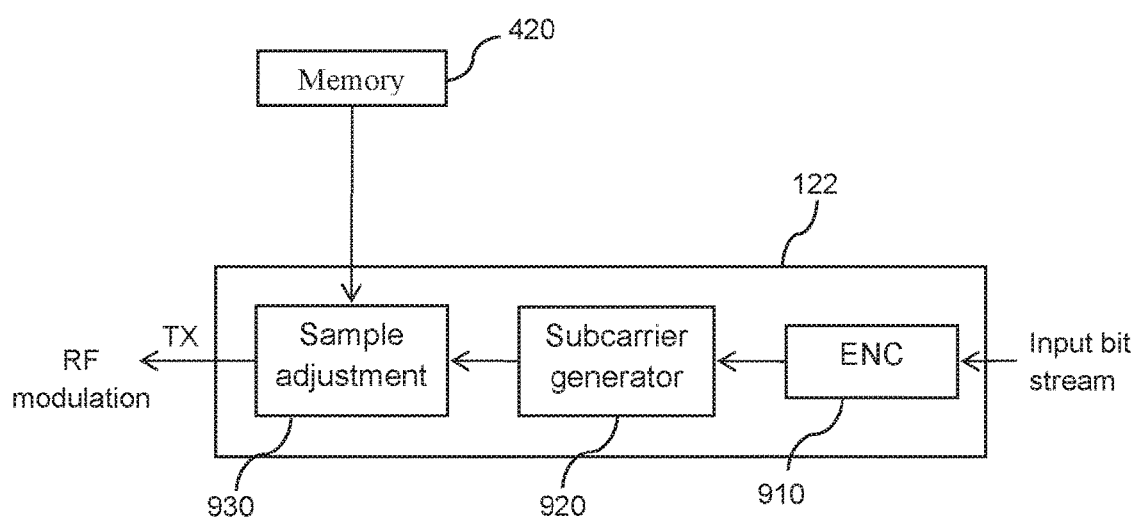
FIG. 9 illustrates a block diagram of a digital transmission module for digital baseband (DBB) controlled sample adjustment in accordance with an embodiment of this invention.

FIG. 9 illustrates a block diagram of digital transmission module 122. The digital transmission module 122 comprises an encoder 910, a subcarrier generator 920 and a sample adjustment module 930. The information bit stream is fed to the encoder 910 and subcarrier generator 920. The output of subcarrier generator is the digital baseband output of NFC Device 2 in synchronous card emulation mode. A digital transmission sample adjustment module 930 is provided to adjust the digital baseband output to compensate the carrier frequency offset. The sample adjustment module 930 can be based on either digital baseband (DBB) or medium access control (MAC). The block diagram shown in FIG. 9 is based on DBB controlled sample adjustment. Further details for sample adjustment module in accordance with MAC will be described below with reference to FIGS. 11 and 12. The estimated CFO is retrieved back from the memory 420 during a transmission process. The output of digital transmission sample adjustment module 930 is sent to an RF module for RF modulation.

For purposes of this discussion, the digital transmission sample adjustment module 930 is applicable for all NFC specifications, e.g. ISO14443A, ISO14443B, FeliCa, and ISO15693, with any data rates.

DBB Controlled Sample Adjustment

Figure 10:
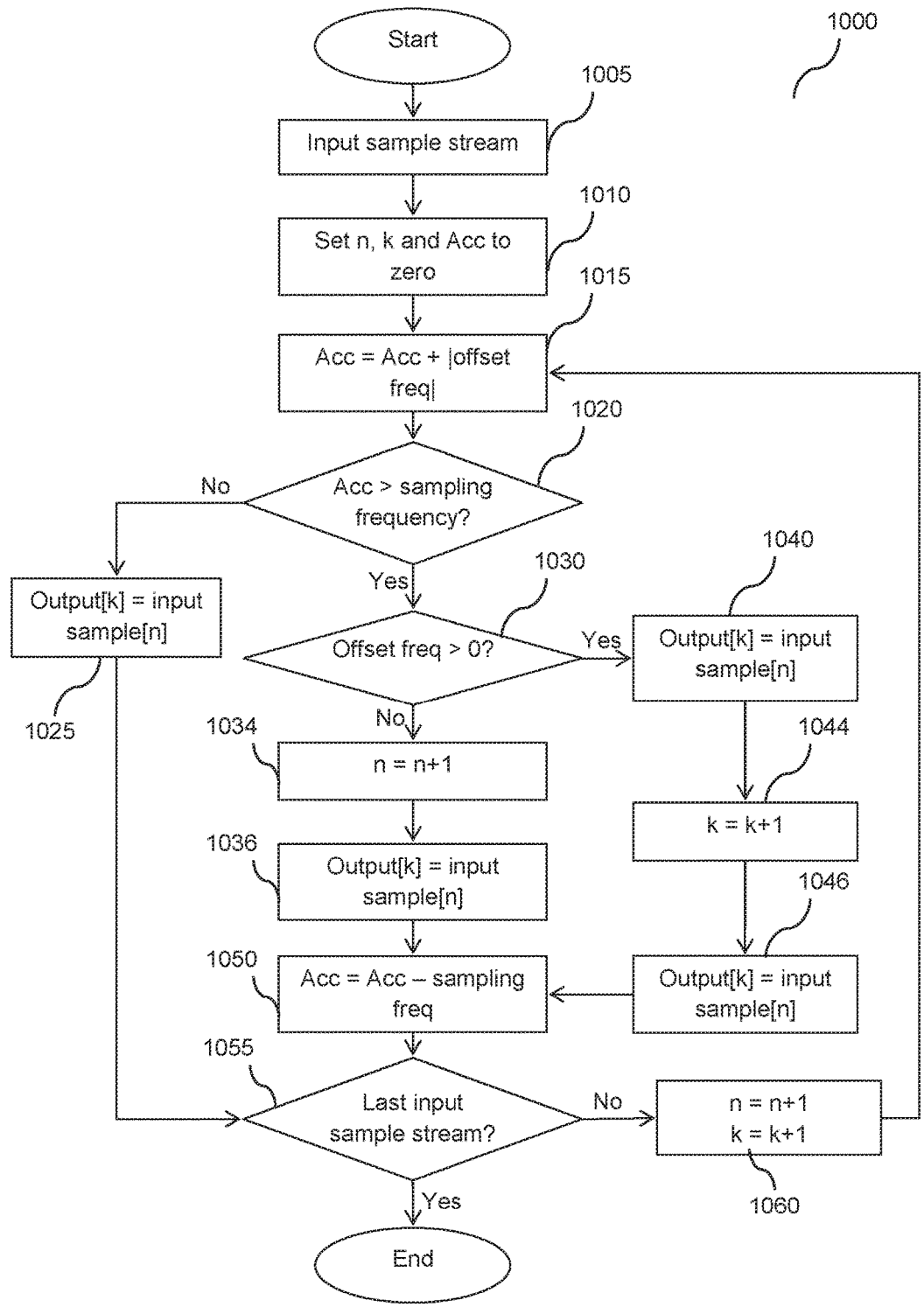
FIG. 10 illustrates a process on the algorithm of DBB controlled sample adjustment at transmission mode shown in FIG. 9 in accordance with an embodiment of this invention.

FIG. 10 illustrates a process 1000 on the algorithm of DBB controlled sample adjustment at transmission mode shown in FIG. 9.

The "input sample" is the output from subcarrier generator 920 in FIG. 9. In brief, the samples are adjusted whenever the accumulation of the absolute value of estimated CFO (i.e. Acc) is greater than or equal to the input sampling frequency (i.e. Sampling_freq). Input sampling frequency could be 13.56 MHz. 1 sample is added if the value of estimated CFO is positive, and 1 sample is skipped if the value of the estimated CFO is negative.

Process 1000 begins with step 1005 by receiving input sample stream from the output of subcarrier generator 920 in FIG. 9. In step 1010, process 1000 resets n, k and Acc to zero where n, k and Acc are variables. Variables n and k are used to indicate the input sample number and output sample number respectively while variable Acc refers to the accumulated estimated CFO.

In step 1015, process 1000 adds the absolute of estimated CFO to Acc. If the Acc is determined to be more than the input sampling frequency in step 1020, process 1000 proceeds to step 1030. If the Acc is determined to be less than the input sampling frequency in step 1020, process 1000 proceeds to step 1025.

In step 1025, the input sample stream is directly output since the accumulated estimated CFO is not more than the input sampling frequency.

In step 1030, process 1000 determines whether the estimated CFO is greater than zero, i.e. whether the estimated CFO is positive or negative. If the estimated CFO is positive, process 1000 proceeds to step 1040. If the estimated CFO is negative, process 1000 proceeds to step 1034. A positive estimated CFO means that $f_{R1}$ is greater than the input sampling frequency and an additional sample is added. A negative estimated CFO means that $f_{R1}$ is smaller than the input sampling frequency and one input sample is skipped.

In step 1034, process 1000 increases n by 1 and subsequently outputs the next input sample with the following expression output[k]=input[n] in step 1036. This is so that the current input sample is skipped and the next input sample is being outputted.

In step 1040, process 1000 outputs the input sample with the following expression output[k]=input[n]. In step 1044, process 1000 increases k by 1 and subsequently outputs the input sample with the following expression output[k]=input[n] in step 1046. This is so that the same sample is outputted twice.

For purposes of this discussion, the expression output[k]=input[n] is used to illustrate which input sample is being outputted by the sample adjustment module 930.

In step 1050, process 1000 deducts the Acc by input sampling frequency. In step 1055, process 1000 determines whether there are any more input sample streams. If there are more input sample streams, process 1000 proceeds to step 1060 to increment n and k by 1 and subsequently repeats from step 1015. If there are no more input sample streams, process 1000 ends.

MAC Controlled TX Sample Adjustment

Figure 12:
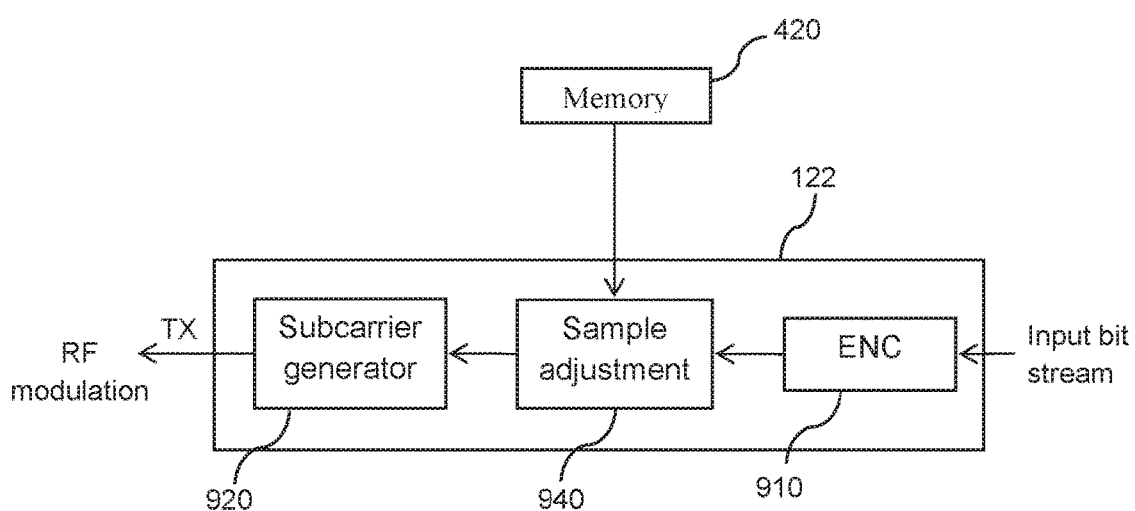
FIG. 12 illustrates a block diagram of a digital transmission module for MAC controlled sample adjustment in accordance with an embodiment of this invention.

The use of register-transfer level (RTL), which is software defined, may have a limitation to implement DBB controlled TX sample adjustment as the number of samples for each information bit is given by MAC. Thus, for the implementation of sample adjustment, MAC may provide the value of N, i.e. number of samples for each encoded bit. The value of N is adjusted based on the estimated CFO. FIG. 12 illustrates the block diagram for a sample adjustment module in accordance with MAC. The sample adjustment module 940 receives the encoded bit stream from the encoder 910 and implements transmission sample adjustment to determine the value of N for each encoded bit. The value of N together with the encoded bit stream is then forwarded to subcarrier generator 920. The subcarrier generator 920 then generates DBB samples for RF modulation.

As an example, for data rate=106 kbps, the default value of N is 128, which is obtained from the ratio between sampling rate of 13.56 MHz and data rate of 106 kbps under synchronous condition. The sample adjustment module 940 outputs the value of N for each encoded bit back to the subcarrier generator 920. For data rate=106 kbps, the value of N is 129 if 1 more sample is added, 127 if 1 sample is removed, or 128 if the default value is chosen.

Similar to DBB sample adjustment, Acc is the accumulation of estimated CFO which is obtained from memory 420. Bit_len is the number of samples per information bit. For example, if data-rate=106 kbps, Bit_len=128; if data-rate=212 kbps, Bit_len=64; etc. The value of N will be equal to Bit_len if Acc≤data-rate. When Acc>data-rate, N will be equal to Bit_len+1 or Bit_len−1 depending on the sign of estimated CFO. DBB samples for 1 bit duration are generated based on the value of N. The relationship between data-rate, Bit_Len and sampling frequency is shown in table 1 below.

| Data-rate (kbps) | Sampling frequency | Bit_Len |
| --- | --- | --- |
| 106 | 13.568 Mhz | 128 |
| 212 | | 64 |
| 424 | | 32 |
| 848 | | 16 |

Figure 11:
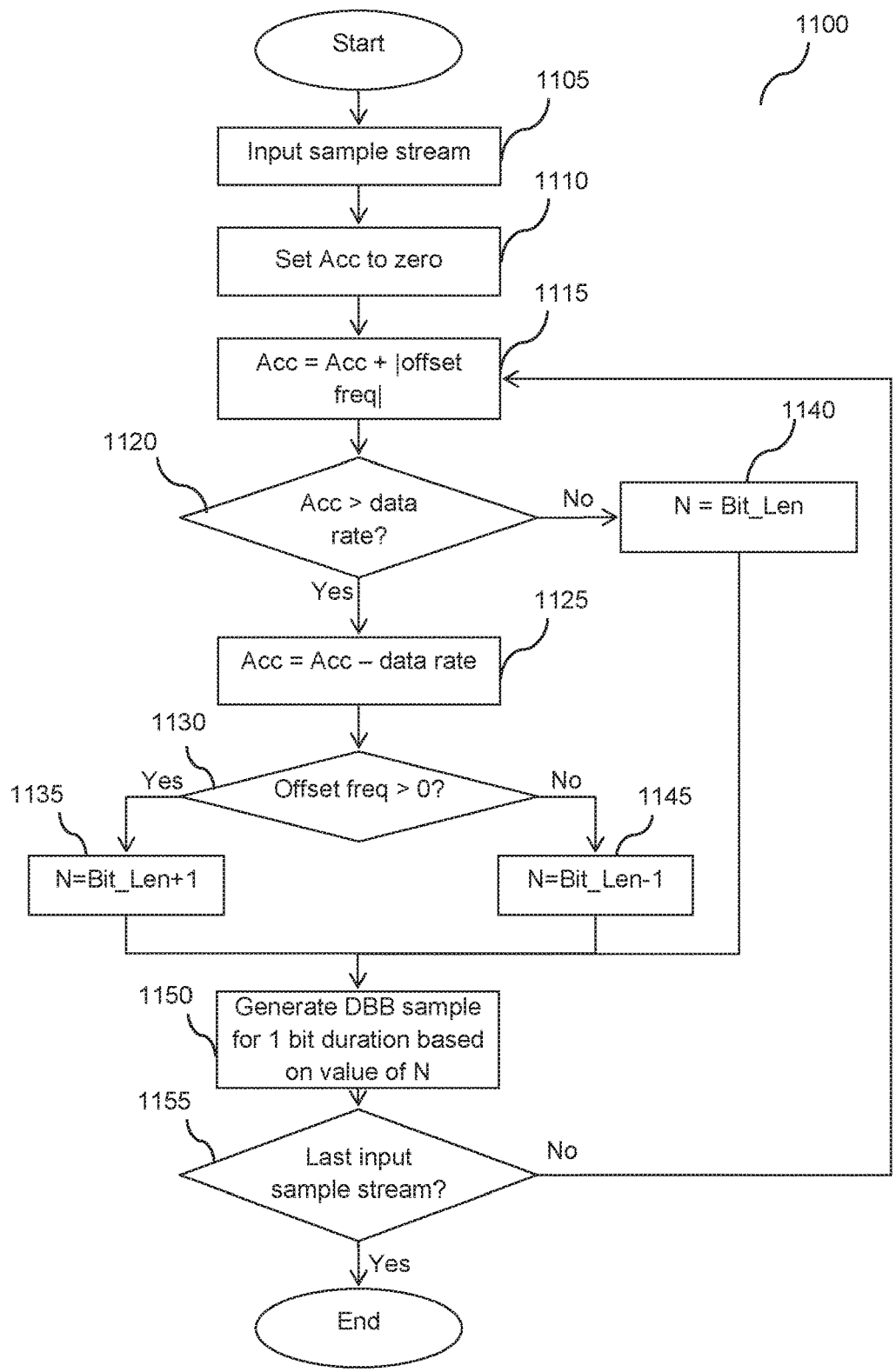
FIG. 11 illustrates a process on the algorithm of medium access control (MAC) controlled sample adjustment at transmission mode shown in FIG. 12 in accordance with an embodiment of this invention.

FIG. 11 illustrates a process 1100 on the algorithm of MAC controlled sample adjustment at transmission mode shown in FIG. 12. Process 1100 begins with step 1105 by receiving an encoded bit stream from the encoder 910 in FIG. 12. In step 1110, process 1100 resets Acc to zero.

In step 1115, process 1100 adds the absolute of CFO estimated offset frequency to Acc. If the Acc is determined to be more than the data-rate in step 1120, process 1100 proceeds to step 1125. If the Acc is determined to be less than the data-rate in step 1120, process 1100 proceeds to step 1140.

In step 1140, the number of samples for each encoded bit is equal to Bit_Len since the accumulated estimated CFO is not more than the data-rate. The value of N is transmitted to the subcarrier generator 920.

In step 1125, process 1100 deducts the Acc by the relevant data-rate.

In step 1130, process 1100 determines whether the estimated CFO is greater than zero, i.e. whether the estimated CFO is positive or negative. If the estimated CFO is positive, process 1100 proceeds to step 1135. If the estimated CFO is negative, process 1100 proceeds to step 1145. A positive estimated CFO means that $f_{R1}$ is greater than the input sampling frequency and an additional sample is added in step 1135. A negative estimated CFO means that $f_{R1}$ is smaller than the input sampling frequency and one sample is removed in step 1145. The value of N is then transmitted to the subcarrier generator 920.

In step 1150, the digital baseband sample for 1 bit duration based on the value of N is generated by the subcarrier generator 920.

In step 1155, process 1100 determines whether there are any more input sample streams. If there are more input sample streams, process 1100 repeats from step 1115. If there are no more input sample streams, process 1100 ends.

A wireless communication device may include both NFC in ALM and PLM modes. During the ALM mode, the asynchronous card emulation mode as illustrated above will be implemented. During the PLM mode, it will use a conventional system to recover the clock from the magnetic field. Hence, the asynchronous card emulation mode as illustrated above can be implemented for existing wireless communication devices including both NFC in ALM and PLM modes.

The above is a description of exemplary embodiments of an NFC device in accordance with the present invention. It is foreseeable that those skilled in the art may design alternative NFC devices based on this disclosure without departing from the scope of the principles described herein. Additionally, statements made herein characterizing the invention refer to an embodiment of the invention and not necessarily all embodiments.

What is claimed is:

1. A method for using a Near Field Communication (NFC) card in asynchronous NFC card emulation mode transmission, comprising:
   estimating, by the NFC card, a carrier frequency offset (CFO) between a carrier frequency of an NFC reader and a carrier frequency of the NFC card;
   adjusting, by the NFC card, digital baseband sampling of a baseband sample output at an NFC card emulation mode transmitter of the NFC card based on the estimated CFO to obtain an adjusted baseband sample output; and
   modulating, by the NFC card, a radio frequency (RF) transmission of the NFC card emulation mode transmitter based on the adjusted baseband sample output.

2. The method according to claim 1, wherein estimating the CFO is triggered upon detecting an RF magnetic field from the NFC reader.

3. The method according to claim 1, wherein estimating the CFO comprises:

obtaining an in-phase component (I) and a quadrature phase component (Q) for a plurality of samples of an input signal from an Analog-to-Digital Converter (ADC) of the NFC card;

computing a phase for each sample;

computing phase differences between a plurality of adjacent samples from the input signal;

averaging the phase differences to obtain the estimated CFO; and storing the estimated CFO in a memory of the NFC card.

4. The method according to claim 3, wherein obtaining the in-phase component (I) and the quadrature phase component (Q) for the plurality of samples of the input signal comprises:

down-converting the input signal at an intermediate frequency into a complex signal centered at zero frequency; and applying a low pass filter for the complex signal to filter harmonics components from the complex signal.

5. The method according to claim 4, wherein down-converting the input signal into the complex signal comprises:

multiplying the input signal with $\cos(2\pi*fc/fs*n)$ to obtain the in-phase component (I); and multiplying the input signal with $\sin(2\pi*fc/fs*n)$ to obtain the quadrature phase component (Q), wherein fc is the carrier frequency, fs is an ADC sampling frequency, and n is a sample number.

6. The method according to claim 3, wherein the phase for each sample is computed with the following expression: $\tan^{-1}(Q/I)$.

7. The method according to claim 1, wherein adjusting the digital baseband sampling of the baseband sample output at the NFC card emulation mode transmitter based on the estimated CFO comprises:

receiving an input sample stream from a subcarrier generator;

setting n, k and Acc to zero;

retrieving the estimated CFO from a memory of the NFC card;

adding the absolute of the estimated CFO to Acc;

determining if Acc is more than an input sampling frequency of the NFC card;

outputting the input sample stream with the following expression output[k]=input[n], in response to Acc being determined to be less than the input sampling frequency;

determining if there are any more input sample streams; and in response to determining that there are more input sample streams, incrementing n and k by 1 and repeating the steps of adding the absolute of the estimated CFO to Acc, determining if Acc is more than an input sampling frequency of the NFC card, outputting the input sample stream with the following expression output[k]=input[n] in response to Acc being determined to be less than the input sampling frequency, and determining if there are any more input sample streams;

wherein n and k are variables, output[k] is an output sample number, input[n] is an input sample number, and Acc is an accumulation of estimated CFO.

8. The method according to claim 7, wherein adjusting the digital baseband sampling of the baseband sample output at the NFC card emulation mode transmitter based on the estimated CFO further comprises:

determining if the estimated CFO is greater than zero or if the estimated CFO is less than zero;

in response to determining that the estimated CFO is less than zero or that the estimated CFO is greater than zero, skipping a sample or adding a sample, respectively; and deducting Acc by the input sampling frequency.

9. The method according to claim 1, wherein adjusting the digital baseband sampling of the baseband sample output at the NFC card emulation mode transmitter based on the estimated CFO comprises:

receiving an encoded bit stream from an encoder;

setting Acc to zero;

retrieving the estimated CFO from a memory of the NFC card;

adding the absolute of the estimated CFO to Acc;

determining if Acc is more than a data-rate;

establishing a number of samples for each encoded bit, N, which is equal to a number of samples per information bit, Bit_Len, in response to Acc being less than the data-rate;

generating a digital baseband sample for a 1 bit duration based on a value of N;

determining if there are any more input sample streams; and in response to determining that there are more input sample streams, repeating the steps of adding the absolute of the estimated CFO to Acc, determining if Acc is more than a data-rate, establishing a number of samples for each encoded bit, N, which is equal to a number of samples per information bit, Bit_Len, in response to Acc being less than the data-rate, generating a digital baseband sample for a 1 bit duration based on a value of N, and determining if there are any more input sample streams;

wherein the data-rate is equal to a sampling frequency divided by Bit_Len, and Acc is an accumulation of estimated CFO.

10. A Near Field Communication (NFC) card, comprising a non-transitory memory having instructions stored thereon, wherein the instructions, when executed, facilitate:

estimating a carrier frequency offset (CFO) between a carrier frequency of an NFC reader and a carrier frequency of the NFC card;

adjusting digital baseband sampling of a baseband sample output at a transmitter of the NFC card based on the estimated CFO to obtain an adjusted baseband sample output; and modulating a radio frequency (RF) transmission of the NFC card based on the adjusted baseband sample output.

11. The NFC card according to claim 10, wherein estimating the CFO is triggered upon detecting an RF magnetic field from the NFC reader.

12. The NFC card according to claim 10, wherein estimating the CFO comprises:

obtaining an in-phase component (I) and a quadrature phase component (Q) for a plurality of samples of an input signal from an Analog-to-Digital Converter (ADC) of the NFC card;

computing a phase for each sample;

computing phase differences between a plurality of adjacent samples from the input signal;

averaging the phase differences to obtain the estimated CFO; and storing the estimated CFO in the memory.

13. The NFC card according to claim 12, wherein obtaining the in-phase component (I) and the quadrature phase component (Q) for the plurality of samples of the input signal comprises:

down-converting the input signal at an intermediate frequency into a complex signal centered at zero frequency; and applying a low pass filter for the complex signal to filter harmonics components from the complex signal.

14. The NFC card according to claim 13, wherein down-converting the input signal into the complex signal comprises multiplying the input signal with $\cos(2\pi \ast fc/fs \ast n)$ to obtain the in-phase component (I); and multiplying the input signal with $\sin(2\pi \ast fc/fs \ast n)$ to obtain the quadrature phase component (Q), wherein fc is the carrier frequency, fs is an ADC sampling frequency, and n is a sample number.

15. The NFC card according to claim 12, wherein computing the phase for each sample comprises computing the phase for each sample with the following expression: $\tan^{-1}(Q/I)$.

16. The NFC card according to claim 10, wherein adjusting the digital baseband sampling of the baseband sample output at the NFC card emulation mode transmitter based on the estimated CFO comprises:

receiving an input sample stream from a subcarrier generator;

setting n, k and Acc to zero;

retrieving the estimated CFO from the memory;

adding the absolute of the estimated CFO to Acc;

determining if Acc is more than an input sampling frequency of the NFC card;

outputting the input sample stream with the following expression output[k]=input[n], in response to Acc being determined to be less than the input sampling frequency;

determining if there are any more input sample streams; and in response to determining that there are more input sample streams, incrementing n and k by 1 and repeating the steps of adding the absolute of the estimated CFO to Acc, determining if Acc is more than an input sampling frequency of the NFC card, outputting the input sample stream with the following expression output[k]=input[n] in response to Acc being determined to be less than the input sampling frequency, and determining if there are any more input sample streams;

wherein n and k are variables, output[k] is an output sample number, input[n] is an input sample number, and Acc is an accumulation of estimated CFO.

17. The NFC card according to claim 16, wherein adjusting the digital baseband sampling of the baseband sample output at the NFC card emulation mode transmitter based on the estimated CFO further comprises:

determining if the estimated CFO is greater than zero or if the estimated CFO is less than zero;

in response to determining that the estimated CFO is less than zero or that the estimated CFO is greater than zero, skipping a sample or adding a sample, respectively; and deduct the deducting Acc by the input sampling frequency.

18. The NFC card according to claim 17, wherein skipping a sample comprises:

incrementing n by 1; and outputting the input sample stream with the following expression output[k]=input[n].

19. The NFC card according to claim 17, wherein adding a sample comprises:

outputting the input sample stream with the following expression output[k]=input[n];

incrementing k by 1; and outputting the input sample stream with the following expression output[k]=input[n].

20. The NFC card according to claim 10, wherein adjusting the digital baseband sampling of the baseband sample output at the NFC card emulation mode transmitter based on the estimated CFO comprises:

receiving an encoded bit stream from an encoder;

setting Acc to zero;

retrieving the estimated CFO from the memory;

adding the absolute of the estimated CFO to Acc;

determining if Acc is more than a data-rate;

establishing a number of samples for each encoded bit, N, is equal to a number of samples per information bit, Bit_Len, in response to Acc being less than the data-rate;

generating a digital baseband sample for a 1 bit duration based on a value of N;

determining if there are any more input sample streams; and in response to determining that there are more input sample streams, repeating the steps of adding the absolute of the estimated CFO to Acc, determining if Acc is more than a data-rate, establishing a number of samples for each encoded bit, N, is equal to a number of samples per information bit, Bit_Len, in response to Acc being less than the data-rate, generating a digital baseband sample for a 1 bit duration based on a value of N, and determining if there are any more input sample streams;

wherein the data-rate is equal to a sampling frequency divided by Bit_Len, and Acc is an accumulation of estimated CFO.

* * * * *

UNITED STATES PATENT AND TRADEMARK OFFICE
CERTIFICATE OF CORRECTION

PATENT NO. : 10,484,215 B2
APPLICATION NO. : 15/965386
DATED : November 19, 2019
INVENTOR(S) : Wicaksana et al.

Page 1 of 1

It is certified that error appears in the above-identified patent and that said Letters Patent is hereby corrected as shown below:

In the Claims

Claim 17, Column 14, Line 6: "deduct the" should be deleted.

Signed and Sealed this
Twenty-first Day of July, 2020

Andrei Iancu
*Director of the United States Patent and Trademark Office*